(No Model.)

W. P. BETTENDORF.
METALLIC WHEEL.

No. 458,412. Patented Aug. 25, 1891.

Witnesses:

Inventor:
W. P. Bettendorf
By his Atty
Phil. T. Dodge

UNITED STATES PATENT OFFICE.

WILLIAM P. BETTENDORF, OF DAVENPORT, IOWA.

METALLIC WHEEL.

SPECIFICATION forming part of Letters Patent No. 458,412, dated August 25, 1891.

Application filed October 3, 1890. Serial No. 366,929. (No model.)

*To all whom it may concern:*

Be it known that I, WILLIAM P. BETTENDORF, of Davenport, in the county of Scott and State of Iowa, have invented certain Improvements in Metal Wheels and Methods of Making Same, of which the following is a specification.

The object of my invention is to provide a metallic wheel which shall combine in a marked degree the qualities of lightness and strength; and to this end it consists, essentially, in the combination of a metallic hub provided with mortises or openings, with tubular metallic spokes which are inserted and expanded within the sockets to secure them in position, and in the above-described method of securing the spokes in place.

Figure 1:
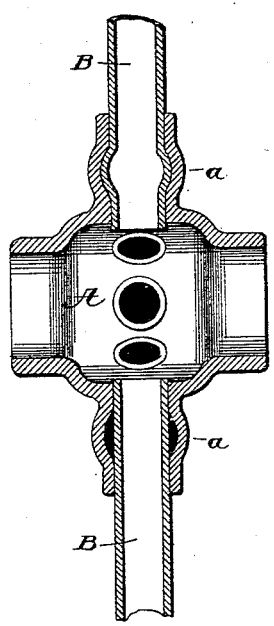
Figure 2:
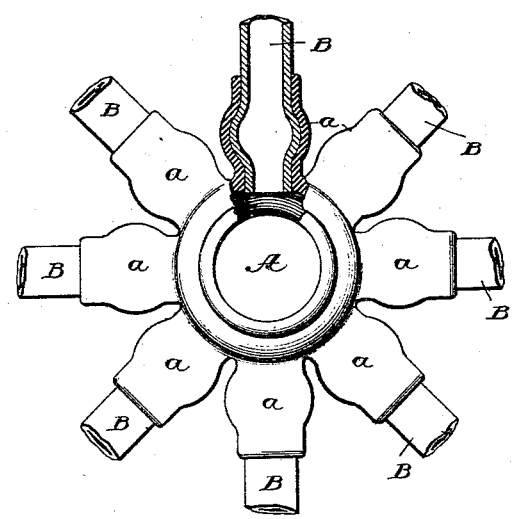
Figure 3:
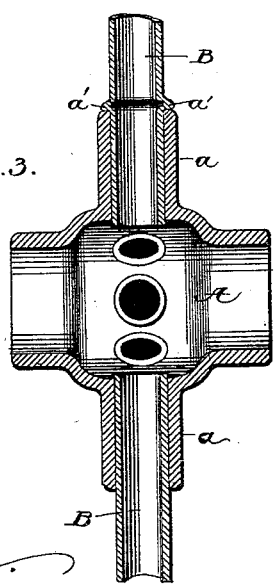

In the accompanying drawings, Figure 1 is a cross-section through a hub of a wheel constructed in accordance with my invention, a spoke on one side being shown in the condition in which it appears after being inserted and before it is secured. Fig. 2 is a side elevation of the same with one of the spokes and the surrounding portion of the hub in section. Fig. 3 is a view through the hub of a wheel with the spokes in slightly-different form.

In constructing my wheel I provide an annular metallic hub A of any suitable form, provided with a series of spoke-receiving sockets $a$, into each of which I insert the inner end of a tubular metallic spoke B. I prefer to enlarge the mortises internally between their ends, as shown in Fig. 1, in which case the spoke of uniform or substantially uniform diameter at the inner end is inserted into the mortise, as shown in the lower part of Fig. 1, and then enlarged by the application of internal pressure, so as to swell it tightly within the interior of the mortise. The spoke thus enlarged by the application of internal pressure and seated tightly against the inner walls of the mortise is held firmly in place, so that it resists both torsional and longitudinal strains. If preferred, the mortises may be of uniform or substantially uniform diameter from their inner to their outer ends, as shown in Fig. 3, in which case the spoke will be made of corresponding form and expanded or enlarged to tightly fit the mortise. If desired, the spoke may be provided with a shoulder, as shown at $a'$, Fig. 3, to bear against the outer surface of the hub. The spokes and their receiving-sockets may be of round or other suitable form in cross-section, and the enlargement of the spoke may be effected by mechanism of any suitable character. The internal pressure to effect the enlargement of the spoke within the mortise or socket may be effected by a tool of any suitable construction inserted within the spoke. A tool, such as is used for flanging the ends of boiler-tubes, consisting of a rotary mandrel carrying rollers and means for forcing the same outward, will answer. As these devices are foreign to my invention it is unnecessary to illustrate them herein.

Having thus described my invention, what I claim is—

1. In a wheel, a tubular hub formed in one piece with spoke-receiving sockets therein, in combination with tubular metal spokes sealed and tightly expanded within the sockets into forcible frictional contact with their walls.

2. A metallic hub having a socket or mortise internally notched between its ends, in combination with a tubular metallic spoke seated in said mortise and enlarged to fit the same, substantially as described and shown.

3. The improved method of securing tubular metallic spokes in metallic hubs, consisting in first seating the spoke in the mortise and thereafter applying pressure internally to enlarge the spoke.

In testimony whereof I hereunto set my hand, this 12th day of September, 1890, in the presence of two attesting witnesses.

WILLIAM P. BETTENDORF.

Witnesses:
 GUSTAV N. MEVES,
 THOS. B. CARSON.